United States Patent
Nojima et al.

(10) Patent No.: US 6,482,378 B1
(45) Date of Patent: Nov. 19, 2002

(54) SELECTIVE REMOVING METHOD OF CARBON MONOXIDE AND HYDROGEN REFINING METHOD

(75) Inventors: Shigeru Nojima, Hiroshima (JP); Toshinobu Yasutake, Hiroshima (JP)

(73) Assignee: Mitsubishi Heavy Industries, Tokyo (JP)

(*) Notice: Subject to any disclaimer, the term of this patent is extended or adjusted under 35 U.S.C. 154(b) by 0 days.

(21) Appl. No.: 09/588,775

(22) Filed: Jun. 7, 2000

(30) Foreign Application Priority Data

Jun. 8, 1999 (JP) .......................... 11-160613
Feb. 1, 2000 (JP) .......................... 2000-024199

(51) Int. Cl.⁷ .................... C01B 31/18; C01B 3/02
(52) U.S. Cl. .................... 423/247; 252/373; 423/437.2; 423/648.1
(58) Field of Search .................... 252/373; 423/247, 423/437.2, 648.1; 502/64, 66, 78, 79, 326

(56) References Cited

U.S. PATENT DOCUMENTS 5,677,254 A * 10/1997 Nojima et al. ............ 502/65
6,162,558 A * 12/2000 Borup et al. .............. 429/19

FOREIGN PATENT DOCUMENTS

| DE | 196 06 286 | 10/1997 |
|----|-----------|---------|
| EP | 0 642 827 | 3/1995  |
| JP | 6-296870  | 10/1994 |
| WO | WO 97/43207 | 11/1997 |

* cited by examiner

*Primary Examiner*—Wayne A. Langel
*Assistant Examiner*—Maribel Medina
(74) *Attorney, Agent, or Firm*—Oblon, Spivak, McClelland, Maier & Neustadt, P.C.

(57) ABSTRACT

Disclosed is a selective carbon monoxide oxidizing catalyst capable of selectively oxidizing CO contained in a gaseous mixture containing $H_2$, CO and an oxidizing agent of $O_2$, comprising a carrier and an active metal consisting of at least one kind of metal selected from the group consisting of Pt, Pd, Ru, Rh and Ir and supported on the carrier, the carrier being a crystalline silicate having the highest to the fifth highest peaks in the powder X-ray diffraction using CuKα ray in the lattice spacing of $3.65\pm0.1$ Å, $3.75\pm0.1$ Å, $3.85\pm0.1$ Å, $10.0\pm0.3$ Å, and $11.2\pm0.3$ Å, and having the composition represented by formula (1) under a dehydrated state:

$$(1\pm0.8)R_2O.[aM_2O_3.bNO.cAl_2O_3].ySiO_2 \qquad (1)$$

where R denotes at least one element selected from the group consisting of an alkali metal and H, M denotes at least one element selected from the group consisting of VIII group elements, rare earth elements, Ti, V, Cr, Nb, Sb and Ga, N denotes at least one element selected from the group consisting of Mg, Ca, Sr, and Ba, and the molar ratios a, b, c and y are: $0 \leq a$, $0 \leq b \leq 20$, $a+c=1$, and $11 \leq y \leq 3000$.

17 Claims, 1 Drawing Sheet

SELECTIVE REMOVING METHOD OF CARBON MONOXIDE AND HYDROGEN REFINING METHOD

CROSS-REFERENCE TO RELATED APPLICATIONS

This application is based upon and claims the benefit of priority from the prior Japanese Patent Applications No. 11-160613, filed Jun. 8, 1999; and No. 2000-024199, filed Feb. 1, 2000, the entire contents of which are incorporated herein by reference.

BACKGROUND OF THE INVENTION

The present invention relates to a catalyst for selective oxidation of carbon monoxide, a selective removing method of carbon monoxide, a hydrogen refining catalyst for selectively oxidizing CO and $CH_3OH$ of a gaseous mixture containing $H_2$, $CH_3OH$, CO and $O_2$ and a hydrogen refining method for removing CO and $CH_3OH$ from a gaseous mixture containing $H_2$, $CH_3OH$ and CO.

A polymer electrolyte fuel cell permits suppressing generation of a pollutant causing an air pollution, is high in its heat efficiency and, thus, is expected to be used widely as a low temperature operation type fuel cell in a motor car power source, a dispersed power source or the like. A platinum catalyst is used mainly in the electrode of the polymer electrolyte fuel cell. Since the platinum catalyst tends to be poisoned by carbon monoxide (CO), it is necessary remove CO from the fuel gas as much as possible. The fuel gas is manufactured by, for example, reforming the fuel such as methanol by means of steam reforming reaction or a partial oxidation reaction so as to produce a hydrogen gas. Then, CO formed as a by-product in the hydrogen manufacturing reaction is removed by a CO shift reaction of $CO+H_2O$ $CO_2+H_2$.

The removal of CO by the CO shift reaction is limited under the restriction in terms of the chemical equilibrium. For example, where a hydrogen gas is manufactured from methanol, followed by applying the CO shift reaction to the hydrogen-containing reaction mixture, the resultant gaseous composition contains about 40 to 60% of $H_2$, about 10% of $CO_2$, about 20% of $H_2O$, and about 0.5% of CO. It should be noted that, in order to prevent the polymer electrolyte fuel cell from being poisoned by CO, it is necessary to lower the CO concentration to 100 ppm or lower. Such being the situation, it is necessary to take measures for further lowering the CO concentration in combination with the CO shift reaction.

As a measure for removing CO contained in the hydrogen-based raw material gas, studied is a method in which an oxidizing agent of $O_2$ is added to the raw material gas and is brought into contact with the raw material gas so as to selectively oxidize CO contained in the raw material gas.

In the conventional catalyst, however, almost all the oxygen gas added to the raw material gas reacts with hydrogen, which is the main constituent of the raw material gas, so as to preferentially burn the hydrogen. As a result, CO is left unremoved from the raw material gas.

On the other hand, Japanese Patent Disclosure (Kokai) No. 6-296870 as claimed discloses a catalyst for cleaning the waste gas. It is taught that the catalyst consists of at least one metal selected from the platinum group elements, which is supported on a crystalline silicate having an X-ray diffraction pattern shown in Table A given in this prior art and represented in terms of the molar ratio of the oxide in a dehydrated state by a chemical formula $(1±0.8)R_2O \cdot [aM_2O_3 \cdot bM'O \cdot cAl_2O_3] \cdot ySiO_2$, where R denotes an alkali metal ion and/or hydrogen ion, M denotes an ion of at least one element selected from the group consisting of VIII group elements, rare earth elements, Ti, V, Cr, Nb, Sb and Ga, M' denotes an ion of alkaline earth metals of Mg, Ca, Sr, Ba, $0<a$, $0≦b<20$, $a+c=1$, and $11<y<3000$.

This prior art also teaches in columns [0008] to [0009] that the particular waste gas cleaning catalyst permits cleaning the waste gas containing NOx, CO and HC in accordance with reaction formulas (1) to (4) given below:

(1) $C_3H_6 + 3/2 O_2 \rightarrow 3CH_2O$ (2) $CH_2O + O_2 \rightarrow CO_2 + H_2O$ (3) $CH_2O + 2NO \rightarrow N_2 + CO_2 + H_2O$ (4) $CO + 1/2 O_2 \rightarrow CO_2$ Reaction (1) given above represents activation of HC, reaction (2) represents combustion of HC, reaction (3) represents a denitrification, and reaction (4) represents combustion of CO.

BRIEF SUMMARY OF THE INVENTION

An object of the present invention is to provide a catalyst for selectively oxidizing carbon monoxide, the catalyst being capable of selectively oxidizing CO contained in a gaseous mixture containing $H_2$, CO and an oxidizing agent of $O_2$.

Another object is to provide a selective carbon monoxide removing method that permits selectively removing CO from a gaseous mixture containing $H_2$ and CO.

Another object is to provide a hydrogen refining catalyst capable of selectively oxidizing CO and $CH_3OH$ contained in a gaseous mixture containing $H_2$, CO, $CH_3OH$ and an oxidizing agent of $O_2$ with a high selective oxidizing capability.

Still another object is to provide a hydrogen refining method capable of selectively oxidizing and removing CO and $CH_3OH$ contained in a gaseous mixture containing $H_2$, CO and $CH_3OH$ with a high removal rate.

According to a first aspect of the present invention, there is provided a selective carbon monoxide oxidizing catalyst capable of selectively oxidizing CO contained in a gaseous mixture containing $H_2$, CO and an oxidizing agent of $O_2$, comprising a carrier and an active metal consisting of at least one kind of metal selected from the group consisting of Pt, Pd, Ru, Rh and Ir and supported on the carrier, the carrier being a crystalline silicate having the highest to the fifth highest peaks in the powder X-ray diffraction using CuKα ray in the lattice spacing of 3.65±0.1 Å, 3.75±0.1 Å, 3.85±0.1 Å, 10.0±0.3 Å, and 11.2±0.3 Å, and having the composition represented by formula (1) under a dehydrated state:

$$(1±0.8)R_2O \cdot [aM_2O_3 \cdot bNO \cdot cAl_2O_3] \cdot ySiO_2 \tag{1}$$

where R denotes at least one element selected from the group consisting of an alkali metal and H, M denotes at least one element selected from the group consisting of VIII group elements, rare earth elements, Ti, V, Cr, Nb, Sb and Ga, N denotes at least one element selected from the group consisting of Mg, Ca, Sr, and Ba, and the molar ratios a, b, c and y are: $0≦a$, $0≦b≦20$, $a+c=1$, and $11≦y≦3000$.

According to a second aspect of the present invention, there is provided a selective removing method of carbon monoxide, comprising the step of bringing a gaseous mixture containing $H_2$, CO and an oxidizing agent of $O_2$ into contact with a selective oxidizing catalyst of carbon monoxide for selectively oxidizing and removing CO from the gaseous mixture, the selective oxidizing catalyst of carbon monoxide comprising a carrier and an active metal consisting of at least one kind of metal selected from the group consisting of Pt, Pd, Ru, Rh and Ir and supported on the carrier, the carrier being a crystalline silicate having the highest to the fifth highest peaks in the powder X-ray diffraction using CuKα ray in the lattice spacing of 3.65±0.1 Å, 3.75±0.1 Å, 3.85±0.1 Å, 10.0±0.3 Å, and 11.2±0.3 Å, and having the composition represented by formula (1) under a dehydrated state:

$$(1\pm0.8)R_2O.[aM_2O_3.bNO.cAl_2O_3].ySiO_2 \qquad (1)$$

where R denotes at least one element selected from the group consisting of an alkali metal and H, M denotes at least one element selected from the group consisting of VIII group elements, rare earth elements, Ti, V, Cr, Nb, Sb and Ga, N denotes at least one element selected from the group consisting of Mg, Ca, Sr, and Ba, and the molar ratios a, b, c and y are: $0 \leq a, 0 \leq b \leq 20, a+c=1$, and $11 \leq y \leq 3000$.

According to a third aspect of the present invention, there is provided a selective removing method of carbon monoxide, comprising the steps of:

preparing a reactor loaded with a catalyst bed housing a selective carbon monoxide oxidizing catalyst; and passing a gaseous mixture containing $H_2$, CO and an oxidizing agent of $O_2$ through the reactor so as to selectively oxidize CO and, thus, remove CO from the gaseous mixture, wherein:

the inlet temperature of the catalyst bed is set at 50 to 250° C.; and the selective carbon monoxide oxidizing catalyst comprises a carrier and an active metal consisting of at least one kind of metal selected from the group consisting of Pt, Pd, Ru, Rh and Ir and supported on the carrier, the carrier being a crystalline silicate having the highest to the fifth highest peaks in the powder x-ray diffraction using CuKα ray in the lattice spacing of 3.65±0.1 Å, 3.75±0.1 Å, 3.85±0.1 Å, 10.0±0.3 Å, and 11.2±0.3 Å, and having the composition represented by formula (1) under a dehydrated state:

$$(1\pm0.8)R_2O.[aM_2O_3.bNO.cAl_2O_3].ySiO_2 \qquad (1)$$

where R denotes at least one element selected from the group consisting of an alkali metal and H, M denotes at least one element selected from the group consisting of VIII group elements, rare earth elements, Ti, V, Cr, Nb, Sb and Ga, N denotes at least one element selected from the group consisting of Mg, Ca, Sr, and Ba, and the molar ratios a, b, c and y are: $0 \leq a, 0 \leq b \leq 20, a\pm c=1$, and $11 \leq y \leq 3000$.

According to a fourth aspect of the present invention, there is provided a hydrogen refining catalyst for selectively oxidizing CO and $CH_3OH$ contained in a gaseous mixture containing $H_2$, CO, $CH_3OH$ and an oxidizing agent of $O_2$, the catalyst comprising a carrier and an active species supported on the carrier, the carrier being a crystalline silicate having the highest to the fifth highest peaks in the powder X-ray diffraction using CuKα ray in the lattice spacing of 3.65±0.1 Å, 3.75±0.1 Å, 3.85±0.1 Å, 10.0±0.3 Å, and 11.2±0.3 Å, and having the composition represented by formula (1) under a dehydrated state:

$$(1\pm0.8)R_2O.[aM_2O_3.bNO.cAl_2O_3].ySiO_2 \qquad (1)$$

where R denotes at least one element selected from the group consisting of an alkali metal and H, M denotes at least one element selected from the group consisting of VIII group elements, rare earth elements, Ti, V, Cr, Nb, Sb and Ga, N denotes at least one element selected from the group consisting of Mg, Ca, Sr, and Ba, and the molar ratios a, b, c and y are: $0 \leq a, 0 \leq b \leq 20, a\pm c=1$, and $11 \leq y \leq 3000$.

According to a fifth aspect of the present invention, there is provided a hydrogen refining catalyst for selectively oxidizing CO and $CH_3OH$ contained in a gaseous mixture containing $H_2$, CO, $CH_3OH$ and an oxidizing agent of $O_2$, comprising a carrier consisting of a silicate and an active species consisting of Pd and supported on the carrier.

According to a sixth aspect of the present invention, there is provided a hydrogen refining method, comprising the step of bringing a gaseous mixture containing $H_2$, CO, $CH_3OH$ and an oxidizing agent of $O_2$ into contact with a hydrogen refining catalyst so as to selectively oxidize and remove CO and $CH_3OH$ from the gaseous mixture, the hydrogen refining catalyst comprising a carrier and an active species supported on the carrier, the carrier being a crystalline silicate having the highest to the fifth highest peaks in the powder X-ray diffraction using CuKα ray in the lattice spacing of 3.65±0.1 Å, 3.75±0.1 Å, 3.85±0.1 Å, 10.0±0.3 Å, and 11.2±0.3 Å, and having the composition represented by formula (1) under a dehydrated state:

$$(1\pm0.8)R_2O.[aM_2O_3.bNO.cAl_2O_3].ySiO_2 \qquad (1)$$

where R denotes at least one element selected from the group consisting of an alkali metal and H, M denotes at least one element selected from the group consisting of VIII group elements, rare earth elements, Ti, V, Cr, Nb, Sb and Ga, N denotes at least one element selected from the group consisting of Mg, Ca, Sr, and Ba, and the molar ratios a, b, c and y are: $0 \leq a, 0 \leq b \leq 20, a\pm c=1$, and $11 \leq y \leq 3000$.

According to a seventh aspect of the present invention, there is provided a hydrogen refining method, comprising the steps of:

preparing a reactor loaded with a catalyst bed housing a hydrogen refining catalyst; and passing a gaseous mixture containing $H_2$, CO, $CH_3OH$ and an oxidizing agent of $O_2$ through the reactor so as to selectively oxidize CO and $CH_3OH$, thus, remove CO and $CH_3OH$ from the gaseous mixture, wherein:

the inlet temperature of the catalyst bed is set at 50 to 250° C.; and the hydrogen refining catalyst comprises a carrier and an active species supported on the carrier, the carrier being a crystalline silicate having the highest to the fifth highest peaks in the powder X-ray diffraction using CuKα ray in the lattice spacing of 3.65±0.1 Å, 3.75±0.1 Å, 3.85±0.1 Å, 10.0±0.3 Å, and 11.2±0.3 Å, and having the composition represented by formula (1) under a dehydrated state:

$$(1\pm0.8)R_2O.[aM_2O_3.bNO.cAl_2O_3].ySiO_2 \qquad (1)$$

where R denotes at least one element selected from the group consisting of an alkali metal and H, M denotes at least one element selected from the group consisting of VIII group elements, rare earth elements, Ti, V, Cr, Nb, Sb and Ga, N denotes at least one element selected from the group consisting of Mg, Ca, Sr, and Ba, and the molar ratios a, b, c and y are: $0 \leq a, 0 \leq b \leq 20, a \pm c = 1$, and $11 \leq y \leq 3000$.

According to an eighth aspect of the present invention, there is provided a hydrogen refining method, comprising the step of bringing a gaseous mixture containing $H_2$, CO, $CH_3OH$ and an oxidizing agent of $O_2$ into contact with a hydrogen refining catalyst so as to selectively oxidize CO and $CH_3OH$, thus, remove CO and $CH_3OH$ from the gaseous mixture, wherein the hydrogen refining catalyst comprises a carrier consisting of a silicate and an active species consisting of Pd and supported on the carrier.

Further, according to a ninth aspect of the present invention, there is provided a hydrogen refining method, comprising the steps of:

preparing a reactor loaded with a catalyst bed housing a hydrogen refining catalyst; and passing a gaseous mixture containing $H_2$, CO, $CH_3OH$ and an oxidizing agent of $O_2$ through the reactor so as to selectively oxidize CO and $CH_3OH$, thus, remove CO and $CH_3OH$ from the gaseous mixture, wherein
the inlet temperature of the catalyst bed is set at 50 to 250° C.; and
the hydrogen refining catalyst comprises a carrier consisting of a silicate and an active species consisting of Pd and supported on the carrier.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A selective carbon monoxide oxidizing catalyst of the present invention will now be described.

The selective carbon monoxide oxidizing catalyst of the present invention is capable of selectively oxidizing CO in a gaseous mixture containing $H_2$, CO and an oxidizing agent of $O_2$. The catalyst comprises a carrier and an active metal consisting of at least one kind of metal selected from Pt, Pd, Ru, Rh and Ir and supported on said carrier, said carrier being a crystalline silicate having the highest to the fifth highest peaks in the powder X-ray diffraction using CuKα ray in the lattice spacing of 3.65±0.1 Å, 3.75±0.1 Å, 3.85±0.1 Å, 10.0±0.3 Å, and 11.2±0.3 Å, and having the composition represented by formula (1) under a dehydrated state:

$$(1 \pm 0.8)R_2O \cdot [aM_2O_3 \cdot bNO \cdot cAl_2O_3] \cdot ySiO_2 \qquad (1)$$

where R denotes at least one element selected from the group consisting of an alkali metal and H, M denotes at least one element selected from the group consisting of VIII group elements, rare earth elements, Ti, V, Cr, Nb, Sb and Ga, N denotes at least one element selected from the group consisting of Mg, Ca, Sr, and Ba, and the molar ratios a, b, c and y are: $0 \leq a, 0 \leq b \leq 20, a \pm c = 1$, and $11 \leq y \leq 3000$.

If the crystalline silicate fails to exhibit peaks at the five lattice spacing in the powder X-ray diffraction using a CuKα ray, or if the peaks, even if exhibited, fail to be any of the highest to the fifth highest peaks, it is impossible to selectively oxidize CO. It is desirable for the crystalline silicate to exhibit the highest to the fifth highest peaks in the powder X-ray diffraction using a CuKα ray at the five lattice spacing and to exhibit the sixth highest peak et seq. in the lattice spacing of 3.0±0.1 Å, 3.3±0.1 Å, 4.25±0.1 Å, 5.6±0.2 Å, 6.0±0.2 Å, and 6.4±0.2 Å. It is more desirable for the crystalline silicate to exhibit the highest to the eleventh highest peaks in the powder x-ray diffraction using a CuKα ray at the eleven lattice spacing and exhibit the twelfth highest peak et seq. at the lattice spacing of 3.05±0.1 Å, 4.6±0.1 Å, 5.7±0.2 Å, and 6.7±0.2 Å.

The selective carbon monoxide oxidizing catalyst of the present invention can be used at 50° C. to 250° C.

The selective carbon monoxide oxidizing catalyst of the present invention is prepared by dipping, for example, the crystalline silicate noted above in an aqueous solution of a salt of the active metal that is to be supported on the crystalline silicate carrier so as to permit at least one kind of the active metal selected from Pt, Pd, Ru, Rh and Ir to be supported on the crystalline silicate by an ion exchange method or an impregnation method.

The selective carbon monoxide oxidizing catalyst of the present invention can be used as it is in the form of a powder or can be held on a porous support.

The selective carbon monoxide oxidizing catalyst of the present invention is capable of selectively oxidizing Co contained in a gaseous mixture containing $H_2$, CO and an oxidizing agent of $O_2$. The mechanism of the selective carbon monoxide oxidation is considered to be as follows.

Figure 1:
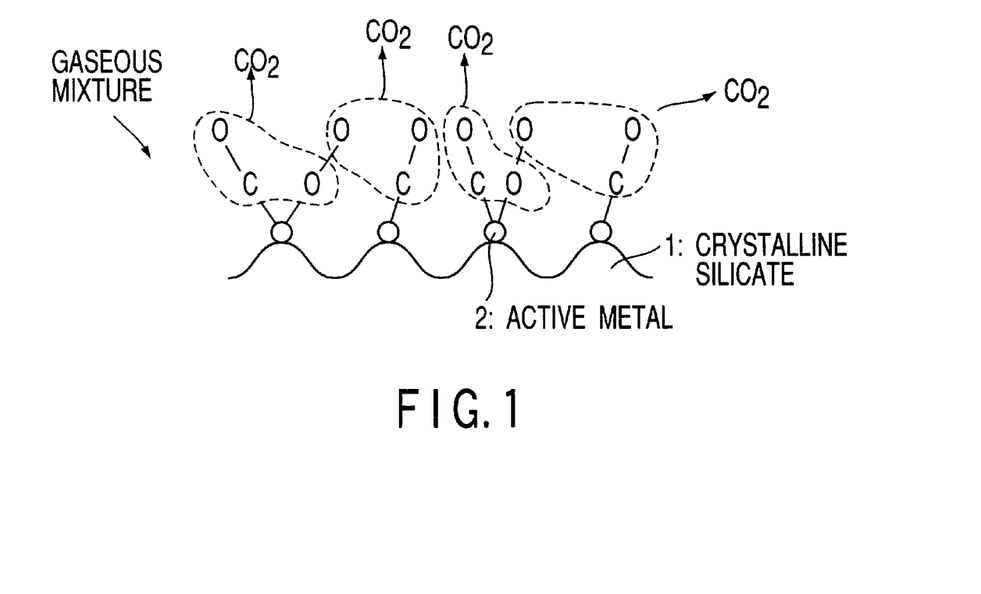
FIG. 1 shows a reaction model of a carbon monoxide oxidizing reaction performed in the presence of the carbon monoxide selective oxidizing catalyst of the present invention.

Specifically, the particular crystalline silicate specified in the present invention is hydrophobic so as to be unlikely to be affected by water that is present together, has a strong charge density distribution, and has fine pores sized about 6 Å and, thus, adapted for the CO adsorption. As a result, the crystalline silicate specified in the present invention is capable of selectively adsorbing a polar substance of CO. It should also be noted that any of Pt, Pd, Ru, Rh and Ir supported on the crystalline silicate exhibits a high activity so as to adsorb $O_2$ contained in the gaseous mixture. As shown in FIG. 1, carbon monoxide CO adsorbed on, for example, the active metal 2 supported by the crystalline silicate carrier 1 is oxidized by $O_2$ adsorbed on the active metal 2 as denoted by reaction formula (A) given below so as to be released from the oxidizing catalyst as $CO_2$. On the other hand, $H_2$ in the gaseous mixture is not adsorbed on the crystalline silicate carrier 1 so as to pass through the catalyst bed. It follows that CO of the gaseous mixture containing $H_2$, $O_2$ and CO is selectively oxidized, thereby selectively removing CO from the gaseous mixture containing $H_2$, $O_2$ and CO:

$2CO+O_2 \rightarrow 2CO_2$ (A)

The selective carbon monoxide removing method of the present invention will now be described.

The method of the present invention is featured in that a gaseous mixture containing $H_2$, CO and an oxidizing agent of $O_2$ is brought into contact with the selective carbon monoxide oxidizing catalyst so as to selectively oxidize CO and, thus, to remove CO from the gaseous mixture.

Since the oxygen gas $O_2$ is for oxidizing CO, $O_2$ need not be present together with $H_2$ and CO from the first. The method of the present invention covers the case where $O_2$ is added to a gaseous mixture containing $H_2$ and CO, followed by bringing the gaseous mixture containing the oxidizing agent of $O_2$ into contact with the selective carbon monoxide oxidizing catalyst. An $O_2$ gas alone can be added as an oxidizing agent. Alternatively, the air can be added as a gas containing an oxidizing agent.

In the gaseous mixture containing $H_2$, CO and $O_2$, it is desirable for the molar ratio of the oxygen ($O_2$) concentration to the carbon monoxide (CO) concentration ($O_2$ concentration/CO concentration) to fall within a range of between 0.5 and 5. If the molar ratio noted above is less than 0.5, it may be difficult to remove CO sufficiently from the gaseous mixture. On the other hand, if the molar ratio exceeds 5, the combustion reaction of CO proceeds rapidly. As a result, the catalyst temperature tends to be markedly increased by the combustion heat. In this case, the selectivity of the selective carbon monoxide oxidizing catalyst tends to be lowered. More preferably, the molar ratio of the oxygen concentration to the carbon monoxide concentration should fall within a range of between 0.5 and 3.

It is desirable for the carbon monoxide concentration in the gaseous mixture containing $H_2$, $O_2$ and CO to be not higher than 4%. If the carbon monoxide concentration exceeds 4%, the catalyst temperature tends to be markedly increased by the combustion heat generated by the combustion reaction of CO. In this case, the selectivity of the selective carbon monoxide oxidizing catalyst tends to be lowered.

The CO removing step can be performed by preparing a reactor loaded with a catalyst bed containing the selective carbon monoxide oxidizing catalyst, followed by circulating a gaseous mixture containing $H_2$, CO and an oxidizing agent of $O_2$ through the reactor so as to selectively oxidize CO.

It is desirable for the inlet temperature of the catalyst bed to fall within a range of between 50° C. and 250° C. If the inlet temperature of the catalyst bed fails to fall within the range noted above, the selectivity of the selective carbon monoxide oxidizing catalyst is lowered, making it difficult to remove CO sufficiently. It is more desirable for the inlet temperature of the catalyst bed to fall within a range of between 60° C. and 240° C.

The method of the present invention can be used for refining a hydrogen-based fuel gas used in, for example, a polymer electrolyte fuel cell.

To be more specific, in order to obtain the fuel gas, a hydrogen gas is manufactured by applying a reforming reaction such as a steam reforming reaction or a partial oxidation reaction to methanol or hydrocarbons such as gasoline or methane. It should be noted that Co formed by a side reaction is contained in the reformed gas. Carbon monoxide contained in the reformed gas is removed in two stages. In the first stage, the CO concentration is lowered to a desired value by, for example, a CO shift reaction. Then, the residual CO is removed by the method of the present invention. To be more specific, the air or an oxygen gas is supplied to the gaseous material having the CO concentration lowered to a desired level. Also, the resultant gaseous mixture is introduced into the selective carbon monoxide oxidizing catalyst of the present invention. As a result, reaction (A) given below takes place preferentially, though side reactions (a) to (c) given below also take place, so as to obtain a fuel gas for a polymer electrolyte fuel cell containing hydrogen as a main component and having CO removed to a desired level, e.g., 50 ppm or less:

$2CO+O_2 \rightarrow 2CO_2$ (A)

$2H_2+O_2 \rightarrow 2H_2O$ (side reaction (a))

$CO_2+H_2 \rightarrow CO+H_2O$ (side reaction (b))

$CO+3H_2 \rightarrow CH_4+H_2O$ (side reaction (c))

As described previously, the selective carbon monoxide oxidizing catalyst of the present invention can perform its function at 50 to 250° C. and, thus, the refined gas can be used without heat exchange operation as a fuel gas for a polymer electrolyte fuel cell operating at about 80° C., making it possible to simplify the manufacture of the fuel gas for a polymer electrolyte fuel cell.

A hydrogen refining catalyst of the present invention will now be described.

The hydrogen refining catalyst of the present invention (hereinafter referred to as a "first hydrogen refining catalyst"), comprises a carrier and an active species supported on said carrier, said carrier being a crystalline silicate having the highest to the fifth highest peaks in the powder X-ray diffraction using CuKα ray in the lattice spacing of 3.65±0.1 Å, 3.75±0.1 Å, 3.85±0.1 Å, 10.0±0.3 Å, and 11.2±0.3 Å, and having the composition represented by formula (1) given previously under a dehydrated state. The catalyst is capable of selectively oxidizing CO and $CH_3OH$ contained in a gaseous mixture containing $H_2$, CO, $CH_3OH$ and an oxidizing agent of $O_2$.

If the crystalline silicate fails to exhibit peaks at the five lattice spacing in the powder x-ray diffraction using a CuKα ray, or if the peaks, even if exhibited, fail to be any of the highest to the fifth highest peaks, it is impossible to selectively oxidize CO and $CH_3OH$. It is desirable for the crystalline silicate to exhibit the highest to the fifth highest peaks in the powder X-ray diffraction using a CuKα ray at the five lattice spacing and to exhibit the sixth highest peak et seq. in the lattice spacing of 3.0±0.1 Å, 3.3±0.1 Å, 4.25±0.1 Å, 5.6±0.2 Å, 6.0±0.2 Å, and 6.4±0.2 Å. It is more desirable for the crystalline silicate to exhibit the highest to the eleventh highest peaks in the powder X-ray diffraction using a CuKα ray at the eleven lattice spacing and exhibit the twelfth highest peak et seq. peaks at the lattice spacing of 3.05±0.1 Å, 4.6±0.1 Å, 5.7±0.2 Å, and 6.7±0.2 Å.

It is desirable for the active species supported on the carrier to include at least one metal selected from Pt, Pd, Ru, Rh and Ir. Particularly, Pd is preferred as an active species because Pd permits improving the methanol oxidizing capability, compared with Pt used as an active species.

The hydrogen refining catalyst according to another embodiment of the present invention (hereinafter referred to as a "second hydrogen refining catalyst") comprises a silicate used as a carrier and Pd used as an active species and supported on the carrier. The second hydrogen refining catalyst of the present invention is capable of selectively oxidizing CO and $CH_3OH$ contained in a gaseous mixture containing $H_2$, CO, $CH_3OH$ and an oxidizing agent of $O_2$.

The silicate used as the carrier is a salt consisting of silicon dioxide ($SiO_2$) and a metal oxide, and includes, for example, Y-type zeolite, A-type zeolite, mordenite, and the crystalline silicate referred to previously. At least one kind of the silicate selected from among those exemplified above can be used as a carrier of the hydrogen refining catalyst.

The hydrogen refining method of the present invention is featured in that a gaseous mixture (or a raw material gas) containing $H_2$, CO, $CH_3OH$ and $O_2$ is brought into contact with the first or second hydrogen refining catalyst so as to selectively oxidize CO and $CH_3OH$ and, thus, to remove CO and $CH_3OH$ from the gaseous mixture.

The oxygen gas ($O_2$) contained in the raw material gas is for oxidizing CO and $CH_3OH$ and, thus, need not be present in the raw material gas together with $H_2$, CO and $CH_3OH$ from the first. The method of the present invention covers the case where an oxidizing agent of $O_2$ is added to a raw material gas containing $H_2$, CO and $CH_3OH$, followed by bringing the resultant gaseous mixture into contact with the first or second hydrogen refining catalyst. A oxygen gas alone can be used as the oxidizing agent. Alternatively, the air can be added as a gas containing an oxidizing agent.

The molar amount of the $O_2$ gas contained in the raw material gas should desirably be 0.5 to 20 times as much as the total molar amount of CO and $CH_3OH$. If the molar amount of the $O_2$ gas is less than 0.5 times as much as the total molar amount noted above, it is difficult to achieve a sufficiently high removal rate of CO and $CH_3OH$. On the other hand, if the molar amount of the $O_2$ gas is larger than 20 times as much as the total amount noted above, the combustion reactions of CO and $CH_3OH$ take place rapidly. As a result, the catalyst temperature tends to be markedly elevated by the combustion heat. It follows that the carbon monoxide selectivity and the methanol selectivity of the catalyst tend to be lowered. The molar amount of the $O_2$ gas contained in the raw material gas should more desirably be 1.5 to 3 times as much as the total molar amount of CO and $CH_3OH$.

It is desirable for the CO concentration in the raw material gas to be not higher than 4%. If the CO concentration exceeds 4%, the catalyst temperature tends to be markedly elevated by the combustion heat generated by the combustion reaction of CO. As a result, the carbon monoxide selectivity and the methanol selectivity of the catalyst tend to be lowered.

It is desirable for the $CH_3OH$ concentration in the raw material gas to be not higher than 2%. If the $CH_3OH$ concentration exceeds 2%, the catalyst temperature tends to be markedly elevated by the combustion heat generated by the combustion reaction of $CH_3OH$. As a result, the carbon monoxide selectivity and the methanol selectivity of the catalyst tend to be lowered.

The removing step of CO and $CH_3OH$ can be performed by preparing a reactor loaded with a catalyst bed containing the first or second hydrogen refining catalyst, followed by circulating a raw material gas containing $H_2$, CO, $CH_3OH$ and an oxidizing agent of $O_2$ through the reactor so as to selectively oxidize CO and $CH_3OH$.

The inlet temperature of the catalyst bed should desirably fall within a range of between 50° C. and 250° C. If the inlet temperature of the catalyst bed fails to fall within the range noted above, the carbon monoxide selectivity and the methanol selectivity of the catalyst tend to be lowered, making it difficult to achieve a sufficiently high removal rate of CO and $CH_3OH$. More preferably, the inlet temperature of the catalyst bed should desirably fall within a range of between 60° C. and 240° C.

The first hydrogen refining catalyst of the present invention described above comprises a carrier and an active species supported on the carrier, the carrier being a crystalline silicate having the highest to the fifth highest peaks in the powder X-ray diffraction using CuKα ray in the lattice spacing of 3.65±0.1 Å, 3.75±0.1 Å, 3.85±0.1 Å, 10.0±0.3 Å, and 11.2±0.3 Å, and having the composition represented by formula (1) given previously under a dehydrated state. The crystalline silicate has a porous structure having pores sized about 6 Å, which is adapted for adsorbing CO and $CH_3OH$. Therefore, the crystalline silicate is capable of selectively adsorbing CO and $CH_3OH$ contained in the raw material gas containing $H_2$, $O_2$, CO and $CH_3OH$. It follows that CO and $CH_3OH$ can be removed without decreasing the hydrogen amount. Incidentally, Co and $CH_3OH$ are oxidized by the oxidizing reactions denoted by formulas (B) and (C) given below, respectively:

$$CO+1/2O_2 \rightarrow CO_2 \qquad (B)$$

$$CH_3OH+1/2_2 \rightarrow CO_2 \pm H_2O \qquad (C)$$

In the first hydrogen refining catalyst of the present invention, at least one metal selected from Pt, Pd, Ru, Rh and Ir is used as an active species. In this case, the $O_2$ adsorbing capability of the active species is improved so as to further improve the carbon monoxide selectivity and the methanol selectivity of the catalyst.

In the raw material gas which contains $H_2$, $O_2$, CO and $CH_3OH$, the molar amount of the $O_2$ gas is set 0.5 to 20 times as much as the molar amount of the sum of CO and $CH_3OH$. In this case, the amount of $O_2$ required for the oxidation is ensured. At the same time, it is possible to suppress the temperature elevation of the catalyst. It follows that it is possible to further improve the removal rate of CO and $CH_3OH$.

The second hydrogen refining catalyst of the present invention comprises a carrier consisting of a silicate and an active species consisting of Pd and supported on the carrier. Since the second hydrogen refining catalyst exhibits a high methanol oxidizing activity, it is possible to allow the oxidizing agent of $O_2$ to selectively oxidize CO and $CH_3OH$ contained in the raw material gas containing $H_2$, $O_2$, CO and $CH_3OH$.

In the second hydrogen refining catalyst of the present invention, at least one silicate selected from the group consisting of Y-type zeolite, A-type zeolite, mordenite and the crystalline silicate referred to previously is used as a carrier. Since the silicate used as the carrier has a porous structure having pores adapted for adsorbing CO and $CH_3OH$, i.e., about 5 to 10 Å, CO and $CH_3OH$ can be selectively adsorbed. As a result, the selective carbon monoxide oxidizing activity and the selective methanol oxidizing activity of the catalyst can be improved. It follows that the CO concentration and the $CH_3OH$ concentration can be further lowered so as to further increase the hydrogen purity of the refined gas.

In the raw material gas which contains $H_2$, $O_2$, CO and $CH_3OH$, the molar amount of the $O_2$ gas is set 0.5 to 20 times as much as the molar amount of the sum of CO and $CH_3OH$. In this case, the amount of $O_2$ required for the oxidation is ensured. At the same time, it is possible to suppress the temperature elevation of the catalyst. It follows that it is possible to further improve the removal rate of CO and $CH_3OH$.

The first and second hydrogen refining catalysts of the present invention can be used for refining a hydrogen-based raw material gas, which is a fuel gas of a polymer electrolyte fuel cell. In order to obtain the hydrogen-based gas, a fuel such as methanol is subjected to, for example, a steam reforming reaction ($CH_3OH+H_2O \rightarrow CO_2+3H_2$) or a partial oxidation reaction so as to obtain a hydrogen gas. If methanol is used as the fuel, the reformed gas obtained contains a desired material of a hydrogen gas, a by-product of a carbon monoxide gas and the unreacted methanol. It should be noted that methanol tends to be decomposed by the platinum catalyst contained in the electrode of the fuel cell so as to generate a poisoning material of carbon monoxide. It is possible to obtain a hydrogen-based gas having a high purity of hydrogen used as a fuel and low in concentrations of CO and $CH_3OH$ by adding an oxygen-containing gas to the reformed gas and by allowing CO and $CH_3OH$ contained in the reform ed gas to be selectively oxidized in the presence of the hydrogen refining catalyst of the present invention.

EXAMPLES

The present invention will now be described more in detail with reference to Examples of the present invention.

EXAMPLE 1

Water-glass No. 1 ($SiO_2$:30%) was dissolved in an amount of 5,616 g in 5,429 g of water to prepare solution A. On the other hand, dissolved in 4,175 g of water were 718.9 g of aluminum sulfate, 110 g of ferric chloride, 47.2 g of calcium acetate, 262 g of sodium chloride, and 2,020 g of a concentrated hydrochloric acid to prepare solution B. These solutions A and B were supplied at predetermined rates into a container to form precipitation, and the mixture was sufficiently stirred to obtain a slurry having a pH value of 8. The slurry was charged in an amount of 20 liters (L) into an autoclave, followed by introducing 500 g of tetrapropyl ammonium bromide into the autoclave to carry out a hydro-thermal synthesis at 160° C. for 72 hours. After the synthesis, the reaction mixture was washed with water and, then, dried, followed by sintering the mixture at 500° C. for 3 hours so as to obtain crystalline silicate 1 having a composition shown in Table 1 under a dehydrated state.

A powder x-ray diffraction measurement using $CuK\alpha$ ray was applied to the resultant crystalline silicate 1 to obtain lattice spacing (d value) and relative intensities of the highest peak to the 15th highest peak, which are shown in Table 2.

As apparent from Table 2, the crystalline silicate 1 exhibited in the powder X-ray diffraction using a $CuK\alpha$ ray the highest to the fifth highest peaks at the lattice spacing of 3.65±0.1 Å, 3.75±0.1 Å, 3.85±0.1 Å, 10.0±0.3 Å, and 11.2±0.3 Å, respectively, the sixth highest to the eleventh highest peaks at the lattice spacing of 3.0±0.1 Å, 3.3±0.1 Å, 4.25±0.1 Å, 5.6±0.2 Å, 6.0±0.2 Å, and 6.4±0.2 Å, and the twelfth highest to the fifteenth highest peaks at the lattice spacing of 3.05±0.1 Å, 4.6±0.1 Å, 5.7±0.2 Å, and 6.7±0.2 Å, respectively.

The crystalline silicate 1 was dipped in a 4N $NH_4Cl$ aqueous solution maintained at 40° C. and the solution was kept stirred for 3 hours so as to carry out the $NH_4$ ion exchange. After the ion exchange, the crystalline silicate 1 was washed and, then, dried at 100° C. for 24 hours, followed by sintering the crystalline silicate at 400° C. for 3 hours so as to obtain the H-type crystalline silicate 1.

Then, a carrier consisting of 100 parts of the H-type crystalline silicate 1 was impregnated with an aqueous solution of chloroplatinic acid ($H_2PtCl_6$) to permit 1 part by weight of platinum to be supported by the crystalline silicate 1, followed by evaporating the solvent and subsequently performing calcination at 500° C. for 5 hours so as to obtain a powdery catalyst.

A binder consisting of 3 parts of alumina sol ($Al_2O_3$:10%) and 55 parts of silica sol ($SiO_2$: 20 parts) was added to the resultant powdery catalyst together with 200 parts of water, and the aqueous system was sufficiently stirred to prepare a slurry for wash coating. Then, a monolithic substrate made of cordierite ceramics and having 400 cell lattice meshes was dipped in the slurry. After the substrate was taken out of the slurry, the slurry attached to the substrate was blown off, followed by drying the substrate at 200° C. The coating amount was 150 g per liter of the monolithic substrate, and the coated substrate constituted a honeycomb catalyst 1.

Examples 2 to 12

Crystalline silicates 2 to 12 having the compositions as shown in Table 1 under a dehydrated state were prepared as in preparation of honeycomb catalyst 1 described above, except that cobalt chloride, ruthenium chloride, rhodium chloride, lanthanum chloride, cerium chloride, titanium chloride, vanadium chloride, chromium chloride, antimony chloride, gallium chloride and niobium chloride were added in place of ferric chloride used in preparation of honeycomb catalyst 1 in a molar amount equal to $Fe_2O_3$ in terms of oxides.

A powder X-ray diffraction measurement using a $CuK\alpha$ ray was applied to each of these crystalline silicates 2 to 12, finding that the lattice spacing and the relative intensities of the highest to the fifteenth highest peaks were as shown in Table 2.

Then, honeycomb catalysts were prepared from the crystalline silicates 2 to 12 as in preparation of honeycomb catalyst 1 described above.

Examples 13 to 15

Crystalline silicates 13 to 15 having the compositions as shown in Table 1 under a dehydrated state were prepared as in preparation of honeycomb catalyst 1 described above, except that magnesium acetate, strontium acetate and barium acetate were added in place of calcium acetate used in preparation of honeycomb catalyst 1 in a molar amount equal to CaO in terms of oxides.

A powder X-ray diffraction measurement using a $CuK\alpha$ ray was applied to each of these crystalline silicates 13 to 15, finding that the lattice spacing and the relative intensities of the highest to the fifteenth highest peaks were as shown in Table 2.

Then, honeycomb catalysts were prepared from the crystalline silicates 13 to 15 as in preparation of honeycomb catalyst 1 described above.

Example 16

A carrier consisting of 100 parts of an H-type crystalline silicate 1 equal to that described previously in conjunction with honeycomb catalyst 1 described previously was impregnated with an aqueous solution of palladium chloride to permit 1 part by weight of Pd to be supported by the carrier, followed by evaporating the solution and drying the carrier impregnated with palladium and subsequently sintering the carrier at 500° C. for 5 hours so as to obtain a powdery catalyst. Further, a honeycomb catalyst 16 was prepared from the powdery catalyst by the method equal to that described previously in conjunction with preparation of honeycomb catalyst 1.

Example 17

A carrier consisting of 100 parts of an H-type crystalline silicate 1 equal to that described previously in conjunction with honeycomb catalyst 1 described previously was impregnated with an aqueous solution of rhodium chloride to permit 1 part by weight of Rh to be supported by the carrier, followed by evaporating the solution and drying the carrier impregnated with rhodium and subsequently sintering the carrier at 500° C. for 5 hours so as to obtain powdery catalyst. Further, a honeycomb catalyst 17 was prepared from the powdery catalyst by the method equal to that described previously in conjunction with preparation of honeycomb catalyst 1.

Example 18

A carrier consisting of 100 parts of an H-type crystalline silicate 1 equal to that described previously in conjunction with honeycomb catalyst 1 described previously was impregnated with an aqueous solution of ruthenium chloride to permit 1 part by weight of Ru to be supported by the carrier, followed by evaporating the solution and drying the carrier impregnated with ruthenium and subsequently sintering the carrier at 500° C. for 5 hours so as to obtain powdery catalyst. Further, a honeycomb catalyst 18 was prepared from the powdery catalyst by the method equal to that described previously in conjunction with preparation of honeycomb catalyst 1.

Example 19

A carrier consisting of 100 parts of an H-type crystalline silicate 1 equal to that described previously in conjunction with honeycomb catalyst 1 described previously was impregnated with an aqueous solution of iridium chloride to permit 1 part by weight of Ir to be supported by the carrier, followed by evaporating the solution and drying the carrier impregnated with iridium and subsequently sintering the carrier at 500° C. for 5 hours so as to obtain powdery catalyst. Further, a honeycomb catalyst 19 was prepared from the powdery catalyst by the method equal to that described previously in conjunction with preparation of honeycomb catalyst 1.

Comparative Example 1

A γ-$Al_2O_3$ powder having a specific surface area of 200 $m^2/g$ was impregnated with an aqueous solution of chloroplatinic acid ($H_2PtCl_6$) to permit 1 part by weight of platinum to be supported by the alumina powder so as to obtain a powdery catalyst. A honeycomb catalyst was prepared from the powdery catalyst by a method similar to the method described previously in conjunction with Example 1.

Comparative Example 2

A γ-$Al_2O_3$ powder having a specific surface area of 200 $m^2/g$ was impregnated with an aqueous solution of palladium chloride to permit 1 part by weight of Pd to be supported by the alumina powder so as to obtain a powdery catalyst. A honeycomb catalyst was prepared from the powdery catalyst by a method similar to the method described previously in conjunction with Example 1.

Comparative Example 3

A γ-$Al_2O_3$ powder having a specific surface area of 200 $m^2/g$ was impregnated with an aqueous solution of rhodium chloride to permit 1 part by weight of Rh to be supported by the alumina powder so as to obtain a powdery catalyst. A honeycomb catalyst was prepared from the powdery catalyst by a method similar to the method described previously in conjunction with Example 1.

Comparative Example 4

A γ-$Al_2O_3$ powder having a specific surface area of 200 $m^2/g$ was impregnated with an aqueous solution of ruthenium chloride to permit 1 part by weight of Ru to be supported by the alumina powder so as to obtain a powdery catalyst. A honeycomb catalyst was prepared from the powdery catalyst by a method similar to the method described previously in conjunction with Example 1.

Comparative Example 5

A γ-$Al_2O_3$ powder having a specific surface area of 200 $m^2/g$ was impregnated with an aqueous solution of iridium chloride to permit 1 part by weight of Ir to be supported by the alumina powder so as to obtain a powdery catalyst. A honeycomb catalyst was prepared from the powdery catalyst by a method similar to the method described previously in conjunction with Example 1.

TABLE 1

|  | Active metal | Number of H-type crystalline silicate | Composition in dehydrated state of crystalline silicate or composition of carrier |
|---|---|---|---|
| Example 1 | Pt | 1 | 0.5 $Na_2O$.0.5 $H_2O$[0.2 $Fe_2O_3$.0.8 $Al_2O_3$.0.2 CaO]25 $SiO_2$ |
| Example 2 | Pt | 2 | 0.5 $Na_2O$.0.5 $H_2O$[0.2 $Co_2O_3$.0.8 $Al_2O_3$.0.2 CaO]25 $SiO_2$ |
| Example 3 | Pt | 3 | 0.5 $Na_2O$.0.5 $H_2O$[0.2 $Ru_2O_3$.0.8 $Al_2O_3$.0.2 CaO]25 $SiO_2$ |
| Example 4 | Pt | 4 | 0.5 $Na_2O$.0.5 $H_2O$[0.2 $Rh_2O_3$.0.8 $Al_2O_3$.0.2 CaO]25 $SiO_2$ |
| Example 5 | Pt | 5 | 0.5 $Na_2O$.0.5 $H_2O$[0.2 $La_2O_3$.0.8 $Al_2O_3$.0.2 CaO]25 $SiO_2$ |
| Example 6 | Pt | 6 | 0.5 $Na_2O$.0.5 $H_2O$[0.2 $Ce_2O_3$.0.8 $Al_2O_3$.0.2 CaO]25 $SiO_2$ |
| Example 7 | Pt | 7 | 0.5 $Na_2O$.0.5 $H_2O$[0.2 $Ti_2O_3$.0.8 $Al_2O_3$.0.2 CaO]25 $SiO_2$ |
| Example 8 | Pt | 8 | 0.5 $Na_2O$.0.5 $H_2O$[0.2 $V_2O_3$.0.8 $Al_2O_3$.0.2 CaO]25 $SiO_2$ |
| Example 9 | Pt | 9 | 0.5 $Na_2O$.0.5 $H_2O$[0.2 $Cr_2O_3$.0.8 $Al_2O_3$.0.2 CaO]25 $SiO_2$ |
| Example 10 | Pt | 10 | 0.5 $Na_2O$.0.5 $H_2O$[0.2 $Sb_2O_3$.0.8 $Al_2O_3$.0.2 CaO]25 $SiO_2$ |
| Example 11 | Pt | 11 | 0.5 $Na_2O$.0.5 $H_2O$[0.2 $Ga_2O_3$.0.8 $Al_2O_3$.0.2 CaO]25 $SiO_2$ |
| Example 12 | Pt | 12 | 0.5 $Na_2O$.0.5 $H_2O$[0.2 $Nb_2O_3$.0.8 $Al_2O_3$.0.2 CaO]25 $SiO_2$ |
| Example 13 | Pt | 13 | 0.5 $Na_2O$.0.5 $H_2O$[0.2 $Fe_2O_3$.0.8 $Al_2O_3$.0.2 MgO]25 $SiO_2$ |
| Example 14 | Pt | 14 | 0.5 $Na_2O$.0.5 $H_2O$[0.2 $Fe_2O_3$.0.8 $Al_2O_3$.0.2 SrO]25 $SiO_2$ |
| Example 15 | Pt | 15 | 0.5 $Na_2O$.0.05 $H_2O$[0.2 $Fe_2O_3$.0.8 $Al_2O_3$.0.2 BaO]25 $SiO_2$ |
| Example 16 | Pd | 1 | 0.5 $Na_2O$.0.5 $H_2O$[0.2 $Fe_2O_3$.0.8 $Al_2O_3$.0.2 CaO]25 $SiO_2$ |
| Example 17 | Rh | 1 | 0.5 $Na_2O$.0.5 $H_2O$[0.2 $Fe_2O_3$.0.8 $Al_2O_3$.0.2 CaO]25 $SiO_2$ |
| Example 18 | Ru | 1 | 0.5 $Na_2O$.0.5 $H_2O$[0.2 $Fe_2O_3$.0.8 $Al_2O_3$.0.2 CaO]25 $SiO_2$ |
| Example 19 | Ir | 1 | 0.5 $Na_2O$.0.5 $H_2O$[0.2 $Fe_2O_3$.0.8 $Al_2O_3$.0.2 CaO]25 $SiO_2$ |
| Comparative Example 1 | Pt | — | $Al_2O_3$ |
| Comparative Example 2 | Pd | — | $Al_2O_3$ |
| Comparative Example 3 | Rh | — | $Al_2O_3$ |
| Comparative Example 4 | Ru | — | $Al_2O_3$ |
| Comparative Example 5 | Ir | — | $Al_2O_3$ |

TABLE 2

| Lattice spacing (d value) | Relative intensity |
|---|---|
| 11.2 ± 0.3 | VS |
| 10.0 ± 0.3 | VS |
| 6.7 ± 0.2 | W |
| 6.4 ± 0.2 | M |
| 6.0 ± 0.2 | M |
| 5.7 ± 0.2 | W |
| 5.6 ± 0.2 | M |
| 4.6 ± 0.1 | W |
| 4.25 ± 0.1 | M |
| 3.85 ± 0.1 | VS |
| 3.75 ± 0.1 | S |
| 3.65 ± 0.1 | S |
| 3.3 ± 0.1 | M |
| 3.05 ± 0.1 | W |
| 3.0 ± 0.1 | M |

VS: Very strong
S: strong
M: medium
W: weak
X-ray source: CuKα

VS: Very strong

S: strong

M: medium

W: weak

X-ray source: CuKα

A CO removal test was conducted by using the honeycomb catalysts prepared in Examples 1 to 19 and Comparative Examples 1 to 5 with respect to a gaseous mixture containing 0.3% of CO, 24% of $CO_2$, 20% of $H_2O$, 0.3% of $O_2$ and 55.4% of $H_2$.

Figure 2:
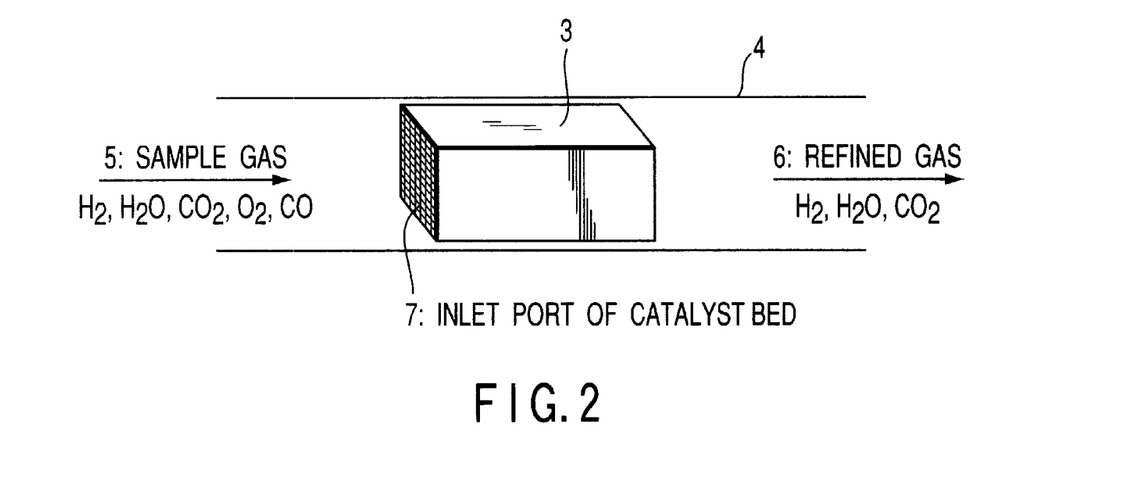
FIG. 2 is a side view showing a reactor used in Example 1 of the present invention.

To be more specific, the honeycomb catalyst 3 was loaded in an amount of 15 cc in the tubular reactor 4, as shown in FIG. 2. A sample gas 5 consisting of the gaseous mixture was introduced into the reactor 4 through the inlet port 7 on the left side of the catalyst bed consisting of the honeycomb catalyst 3. While passing through the catalyst bed, the sample gas was subjected to a carbon monoxide oxidizing reaction, with the result that a refined gas 6 was taken out through the outlet port on the right side of the catalyst bed. The surface of the honeycomb catalyst 3 was coated with carbon monoxide selective oxidizing catalyst. The inlet port 7 of the catalyst bed was the porous surface of the honeycomb catalyst 3. GHSV (gas hourly space velocity) was set at 10,000$h^{-1}$ (gas amount of 150 NL/h). The inlet temperature of the catalyst bed was changed for the CO removal test. Specifically, the CO removal test was conducted under the inlet temperature of the catalyst bed set at 50° C., 80° C., 110° C., 140° C., 170° C., 200° C. or 250° C. Further, during the CO removal test, the CO concentration at the outlet port of the catalyst bed was continuously monitored by a Co meter of ND-IR type. The CO concentration was measured when the CO concentration was stabilized. Table 3 shows the CO concentration thus measured.

TABLE 3

| | Active metal | CO concentration at outlet port of catalyst bed at various inlet temperature of catalyst bed (ppm) | | | | | | |
|---|---|---|---|---|---|---|---|---|
| | | 50° C. | 80° C. | 110° C. | 140° C. | 170° C. | 200° C. | 250° C. |
| Example 1 | Pt | 28 | 15 | 8 | 17 | 70 | 300 | 1500 |
| Example 2 | Pt | 26 | 13 | 7 | 15 | 65 | 290 | 1400 |
| Example 3 | Pt | 23 | 11 | 6 | 13 | 49 | 270 | 1320 |
| Example 4 | Pt | 20 | 10 | 6 | 12 | 35 | 290 | 1200 |
| Example 5 | Pt | 23 | 11 | 9 | 16 | 34 | 350 | 1100 |
| Example 6 | Pt | 21 | 10 | 7 | 15 | 47 | 290 | 1400 |
| Example 7 | Pt | 22 | 11 | 8 | 14 | 45 | 300 | 1500 |
| Example 8 | Pt | 23 | 10 | 6 | 13 | 39 | 290 | 1700 |
| Example 9 | Pt | 21 | 10 | 7 | 14 | 45 | 300 | 1800 |
| Example 10 | Pt | 20 | 9 | 6 | 14 | 29 | 280 | 1700 |
| Example 11 | Pt | 19 | 12 | 8 | 15 | 36 | 280 | 1700 |
| Example 12 | Pt | 22 | 14 | 7 | 14 | 43 | 280 | 1600 |
| Example 13 | Pt | 21 | 15 | 8 | 15 | 42 | 290 | 1600 |
| Example 14 | Pt | 23 | 16 | 7 | 14 | 42 | 280 | 1600 |
| Example 15 | Pt | 22 | 14 | 7 | 13 | 38 | 250 | 1500 |
| Example 16 | Pd | 45 | 26 | 15 | 20 | 39 | 300 | 2000 |
| Example 17 | Rh | 100 | 45 | 19 | 15 | 15 | 190 | 700 |
| Example 18 | Ru | 120 | 29 | 20 | 10 | 6 | 14 | 66 |
| Example 19 | Ir | 60 | 30 | 12 | 10 | 18 | 80 | 290 |
| Comparative Example 1 | Pt | 1200 | 1600 | 1700 | 1800 | 1900 | 2500 | 2900 |
| Comparative Example 2 | Pd | 1500 | 1400 | 1000 | 1300 | 1600 | 2200 | 2800 |
| Comparative Example 3 | Rh | 2300 | 2000 | 1900 | 1600 | 1500 | 2000 | 2500 |
| Comparative Example 4 | Ru | 2400 | 2300 | 1800 | 1600 | 1400 | 2000 | 2300 |
| Comparative Example 5 | Ir | 2200 | 2100 | 2000 | 2000 | 2200 | 2300 | 2400 |

As apparent from Table 3, the honeycomb catalysts of Examples 1 to 19 permit lowering the CO concentration at the outlet port of the catalyst bed, compared with the honeycomb catalysts of Comparative Examples 1 to 5. Table 3 also shows that the honeycomb catalysts of Examples 1 to 19 permit lowering the CO concentration at the outlet port of the catalyst bed to 50 ppm or less, if the inlet temperature of the catalyst bed is set at suitable values.

It has also been confirmed that the honeycomb catalysts of Examples 1 to 19 are scarcely affected by the water concentration and excellent in durability.

The effects given by the concentration of the oxygen gas added was studied with respect to the honeycomb catalysts for Examples 1, 16, 17, 18 and 19. Specifically, four kinds of test gases (i) to (iv) given below were prepared, and a CO removal test was conducted for each of these test gases.

(i) Test gas containing 0.3% of CO, 24% of $CO_2$, 20% of $H_2O$, 0.15% Of $O_2$, and 55.55% of $H_2$ (molar ratio of $O_2$ concentration to CO concentration: 0.5);

(ii) Test gas containing 0.3% of CO, 24% of $CO_2$, 20% of $H_2O$, 0.3% of $O_2$, and 55.4% of $H_2$ (molar ratio of $O_2$ concentration to CO concentration: 1.0);

(iii) Test gas containing 0.3% of CO, 24% of $CO_2$, 20% of $H_2O$, 0.5% of $O_2$, and 55.2% of $H_2$ (molar ratio of $O_2$ concentration to CO concentration: 1.7);

(iv) Test gas containing 0.3% of CO, 24% of $CO_2$, 20% of $H_2O$, 1.0% of $O_2$, and 54.7% of $H_2$ (molar ratio of $O_2$ concentration to CO concentration: 3.3);

During the CO removal test, the catalyst loading amount in the reactor and GHSV (gas hourly space velocity) were set equal to those in the test described previously. Also, the inlet temperatures of the catalyst beds, which were found satisfactory in the test described previously, were employed in this test. Table 4 shows the results of the test.

TABLE 4

| | | | CO concentration at outlet port of catalyst bed at various molar ratio ($O_2$/CO) | | | |
|---|---|---|---|---|---|---|
| Example | Active metal | Inlet temperature of catalyst bed | $O_2$/CO 0.5 | $O_2$/CO 1.0 | $O_2$/CO 1.7 | $O_2$/CO 3.3 |
| 1 | Pt | 110° C. | 15 | 8 | 16 | 29 |
| 16 | Pd | 110° C. | 38 | 15 | 30 | 60 |
| 17 | Rh | 140° C. | 41 | 13 | 28 | 50 |
| 18 | Ru | 170° C. | 22 | 6 | 14 | 60 |
| 19 | Ir | 140° C. | 23 | 10 | 30 | 50 |

As apparent from Table 4, the honeycomb catalysts for Examples 1, 16, 17, 18 and 19 make it possible to lower the carbon monoxide concentration at the outlet port of the catalyst bed to 60 ppm or less if the molar ratio of the $O_2$ concentration to the CO concentration is set at 5 or less.

Further, the effects given by the CO concentration was studied with respect to the honeycomb catalyst for Example 1. Specifically, five kinds of test gases (1) to (5) given below were prepared and a CO removal test was conducted for each of these test gases:

(1) Test gas containing 0.3% of CO, 24% of $CO_2$, 20% of $H_2O$, 0.3% of $O_2$, and 55.4% of $H_2$;

(2) Test gas containing 0.6% of CO, 24% of $CO_2$, 20% of $H_2O$, 0.6% of $O_2$, and 54.8% of $H_2$;

(3) Test gas containing 1.0% of CO, 24% of $CO_2$, 20% of $H_2O$, 1.0% of $O_2$, and 54% of $H_2$;

(4) Test gas containing 2.0% of CO, 24% of $CO_2$, 20% of $H_2O$, 2.0% of $O_2$, and 52% of $H_2$;

(5) Test gas containing 4.0% of CO, 24% of $CO_2$, 20% of $H_2O$, 4.0% Of $O_2$, and 48% of $H_2$.

In each of test gases (1) to (5), the molar ratio of the $O_2$ concentration to the CO concentration was set at 1.

During the CO removal test, the catalyst loading amount in the reactor and GHSV (gas hourly space velocity) were set as in the test described previously. Also, the inlet temperature of the catalyst bed was set at 110° C. or 140° C. Table 5 shows the results.

TABLE 5

| | CO concentration (ppm) at outlet port of catalyst bed | | | | |
|---|---|---|---|---|---|
| | Inlet CO concentration of the catalyst bed 0.3% | Inlet CO concentration of the catalyst bed 0.6% | Inlet CO concentration of the catalyst bed 1.0% | Inlet CO concentration of the catalyst bed 2.0% | Inlet CO concentration of the catalyst bed 4.0% |
| Inlet temperature of the catalyst bed 110° C. | 8 ppm | 8 ppm | 11 ppm | 13 ppm | 15 ppm |
| Inlet temperature of the catalyst bed 140° C. | 17 ppm | 19 ppm | 21 ppm | 23 ppm | 24 ppm |

As apparent from Table 5, the honeycomb catalyst prepared in Example 1 made it possible to lower the carbon monoxide concentration at the inlet of the catalyst bed (carbon monoxide concentration of the test gas), which was set at 0.3 to 4.0%, to 30 ppm or lower at the outlet port of the catalyst bed.

EXAMPLE 20

Water-glass No. 1 (SiO$_2$:30%) was dissolved in an amount of 5,616 g in 5,429 g of water to prepare solution A. On the other hand, dissolved in 4,175 g of water were 718.9 g of aluminum sulfate, 110 g of ferric chloride, 47.2 g of calcium acetate, 262 g of sodium chloride, and 2,020 g of a concentrated hydrochloric acid to prepare solution B. These solutions A and B were supplied at predetermined rates into a container to form precipitation, and the mixture was sufficiently stirred to obtain a slurry having a pH value of 8. The slurry was charged in an amount of 20 liters (L) into an autoclave, followed by introducing 500 g of tetrapropyl ammonium bromide into the autoclave to carry out a hydrothermal synthesis at 160° C. for 72 hours. After the synthesis, the reaction mixture was washed with water and, then, dried, followed by sintering the mixture at 500° C. for 3 hours so as to obtain crystalline silicate 1 having a composition shown in Table 6 under a dehydrated state.

A powder X-ray diffraction measurement using CuKα ray was applied to the resultant crystalline silicate 1 to obtain lattice spacing (d value) and relative intensities of the highest peak to the 15th highest peak, which are shown in Table 2 referred to previously.

The crystalline silicate 1 was dipped in a 4N NH$_4$Cl aqueous solution maintained at 40° C. and the solution was kept stirred for 3 hours so as to carry out the NH$_4$ ion exchange. After the ion exchange, the crystalline silicate 1 was washed and, then, dried at 100° C. for 24 hours, followed by sintering the crystalline silicate at 400° C. for 3 hours so as to obtain an H-type crystalline silicate 1.

Then, a carrier consisting of 100 parts of the H-type crystalline silicate 1 was impregnated with an aqueous solution of chloroplatinic acid (H$_2$PtCl$_6$) to permit 1 part by weight of platinum to be supported by the crystalline silicate 1, followed by evaporating the solvent and subsequently performing sintering at 500° C. for 5 hours so as to obtain a powdery catalyst.

A binder consisting of 3 parts of alumina sol (Al$_2$O$_3$:10%) and 55 parts of silica sol (SiO$_2$: 20 parts) was added to the resultant powdery catalyst together with 200 parts of water, and the aqueous system was sufficiently stirred to prepare a slurry for wash coating. Then, a monolithic substrate made of cordierite ceramics and having 400 cell lattice meshes was dipped in the slurry. After the substrate was taken out of the slurry, the slurry attached to the substrate was blown off, followed by drying the substrate at 200° C. The coating amount was φper liter of the monolithic substrate, and the coated substrate constituted a honeycomb catalyst of Example 20.

Examples 21 to 31

Crystalline silicates 2 to 12 having the compositions as shown in Table 6 under a dehydrated state were prepared as in preparation of honeycomb catalyst for Example 20, except that cobalt chloride, ruthenium chloride, rhodium chloride, lanthanum chloride, cerium chloride, titanium chloride, vanadium chloride, chromium chloride, antimony chloride, gallium chloride and niobium chloride were added in place of ferric chloride used in preparation of honeycomb catalyst for Example 20 in a molar amount equal to Fe$_2$O$_3$ in terms of oxides.

A powder X-ray diffraction measurement using a CuKα ray was applied to each of these crystalline silicates 2 to 12, finding that the lattice spacing and the relative intensities of the highest to the fifteenth highest peaks were as shown in Table 2 referred to previously. Then, honeycomb catalysts were prepared from the crystalline silicates 2 to 12 as in preparation of honeycomb catalyst for Example 20 described above.

Examples 32 to 34

Crystalline silicates 13 to 15 having the compositions as shown in Table 6 under a dehydrated state were prepared as in preparation of honeycomb catalyst for Example 20, except that magnesium acetate, strontium acetate and barium acetate were added in place of calcium acetate used in preparation of the honeycomb catalyst in Example 20 in a molar amount equal to CaO in terms of oxides.

A powder X-ray diffraction measurement using a CuKα ray was applied to each of these crystalline silicates 13 to 15, finding that the lattice spacing and the relative intensities of the highest to the fifteenth highest peaks were as shown in Table 2 referred to previously. Then, honeycomb catalysts were prepared from the crystalline silicates 13 to 15 as in preparation of honeycomb catalyst for Example 20 described above.

Example 35

A honeycomb catalyst was prepared as in Example 20, except that palladium chloride was used for the synthesis of the powdery catalyst in place of chloroplatinic acid used in Example 20.

Examples 36 to 39

A honeycomb catalyst was prepared as in Example 20, except that palladium chloride, rhodium chloride, ruthenium chloride or iridium chloride was used for the synthesis of the powdery catalyst in place of chloroplatinic acid used in Example 20.

Example 40

A carrier consisting of 100 parts of an H-type Y-zeolite (molar ratio of SiO$_2$ to Al$_2$O$_3$ being 5.2) was impregnated with an aqueous solution of palladium chloride to permit 1 part by weight of Pd to be supported by the carrier, followed by evaporating the solvent and drying the carrier impregnated with palladium and subsequently sintering the carrier at 500° C. for 5 hours so as to obtain a powdery catalyst. Further, a honeycomb catalyst was prepared from the powdery catalyst as in Example 20.

Example 41

A carrier consisting of 100 parts of a Ca-type A-zeolite (molar ratio of SiO$_2$ to Al$_2$O$_3$ being 0.5) was impregnated with an aqueous solution of palladium chloride to permit 1 part by weight of Pd to be supported by the carrier, followed by evaporating the solvent and drying the carrier impregnated with palladium and subsequently sintering the carrier at 500° C. for 5 hours so as to obtain a powdery catalyst. Further, a honeycomb catalyst was prepared from the powdery catalyst as in Example 20.

Example 42

A carrier consisting of 100 parts of a H-type mordenite (molar ratio of SiO$_2$ to Al$_2$O$_3$ being 10) was impregnated with an aqueous solution of palladium chloride to permit 1 part by weight of Pd to be supported by the carrier, followed by evaporating the solvent and drying the carrier impregnated with palladium and subsequently sintering the carrier at 500° C. for 5 hours so as to obtain a powdery catalyst. Further, a honeycomb catalyst was prepared from the powdery catalyst as in Example 20.

Comparative Example 6

An H-type anatase-type $TiO_2$ powder was impregnated with an aqueous solution of chloroplatinic acid ($H_2PtCl_6$) to permit 1 part by weight of platinum to be supported by the $TiO_2$ powder, followed by evaporating the solvent and, then, sintering the Pt-impregnated $TiO_2$ powder at 500° C. for 5 hours so as to obtain a powdery catalyst. A honeycomb catalyst was prepared from the powdery catalyst as in Example 20.

to obtain a powdery catalyst. A honeycomb catalyst was prepared from the powdery catalyst as in Example 20.

Comparative Example 9

A $\gamma$-$Al_2O_3$ powder was impregnated with an aqueous solution of palladium chloride to permit 1 part by weight of Pd to be supported by the $\gamma$-alumina powder, followed by evaporating the solvent and, then, sintering the Pd-impregnated $\gamma$-$Al_2O_3$ powder at 500° C. for 5 hours so as to obtain a powdery catalyst. A honeycomb catalyst was prepared from the powdery catalyst as in Example 20.

TABLE 6

List of tested catalysts

| Example No. | Active metal | Number of H-type crystalline silicate | Composition of crystalline silicate under dehydrated state and other carriers used |
|---|---|---|---|
| 20 | Pt | 1 | 0.5 $Na_2O$.0.5 $H_2O$[0.2 $Fe_2O_3$.0.8 $Al_2O_3$.0.2 CaO]25 $SiO_2$ |
| 21 | Pt | 2 | 0.5 $Na_2O$.0.5 $H_2O$[0.2 $Co_2O_3$.0.8 $Al_2O_3$.0.2 CaO]25 $SiO_2$ |
| 22 | Pt | 3 | 0.5 $Na_2O$.0.5 $H_2O$[0.2 $Ru_2O_3$.0.8 $Al_2O_3$.0.2 CaO]25 $SiO_2$ |
| 23 | Pt | 4 | 0.5 $Na_2O$.0.5 $H_2O$[0.2 $Rh_2O_3$.0.8 $Al_2O_3$.0.2 CaO]25 $SiO_2$ |
| 24 | Pt | 5 | 0.5 $Na_2O$.0.5 $H_2O$[0.2 $La_2O_3$.0.8 $Al_2O_3$.0.2 CaO]25 $SiO_2$ |
| 25 | Pt | 6 | 0.5 $Na_2O$.0.5 $H_2O$[0.2 $Ce_2O_3$.0.8 $Al_2O_3$.0.2 CaO]25 $SiO_2$ |
| 26 | Pt | 7 | 0.5 $Na_2O$.0.5 $H_2O$[0.2 $Ti_2O_3$.0.8 $Al_2O_3$.0.2 CaO]25 $SiO_2$ |
| 27 | Pt | 8 | 0.5 $Na_2O$.0.5 $H_2O$[0.2 $V_2O_3$.0.8 $Al_2O_3$.0.2 CaO]25 $SiO_2$ |
| 28 | Pt | 9 | 0.5 $Na_2O$.0.5 $H_2O$[0.2 $Cr_2O_3$.0.8 $Al_2O_3$.0.2 CaO]25 $SiO_2$ |
| 29 | Pt | 10 | 0.5 $Na_2O$.0.5 $H_2O$[0.2 $Sb_2O_3$.0.8 $Al_2O_3$.0.2 CaO]25 $SiO_2$ |
| 30 | Pt | 11 | 0.5 $Na_2O$.0.5 $H_2O$[0.2 $Ga_2O_3$.0.8 $Al_2O_3$.0.2 CaO]25 $SiO_2$ |
| 31 | Pt | 12 | 0.5 $Na_2O$.0.5 $H_2O$[0.2 $Nb_2O_3$.0.8 $Al_2O_3$.0.2 CaO]25 $SiO_2$ |
| 32 | Pt | 13 | 0.5 $Na_2O$.0.5 $H_2O$[0.2 $Fe_2O_3$.0.8 $Al_2O_3$.0.2 MgO]25 $SiO_2$ |
| 33 | Pt | 14 | 0.5 $Na_2O$.0.5 $H_2O$[0.2 $Fe_2O_3$.0.8 $Al_2O_3$.0.2 SrO]25 $SiO_2$ |
| 34 | Pt | 15 | 0.5 $Na_2O$.0.05 $H_2O$[0.2 $Fe_2O_3$.0.8 $Al_2O_3$.0.2 BaO]25 $SiO_2$ |
| 35 | Pd* | 1 | 0.5 $Na_2O$.0.5 $H_2O$[0.2 $Fe_2O_3$.0.8 $Al_2O_3$.0.2 CaO]25 $SiO_2$ |
| 36 | Pd | 1 | 0.5 $Na_2O$.0.5 $H_2O$[0.2 $Fe_2O_3$.0.8 $Al_2O_3$.0.2 CaO]25 $SiO_2$ |
| 37 | Rh | 1 | 0.5 $Na_2O$.0.5 $H_2O$[0.2 $Fe_2O_3$.0.8 $Al_2O_3$.0.2 CaO]25 $SiO_2$ |
| 38 | Ru | 1 | 0.5 $Na_2O$.0.5 $H_2O$[0.2 $Fe_2O_3$.0.8 $Al_2O_3$.0.2 CaO]25 $SiO_2$ |
| 39 | Ir | 1 | 0.5 $Na_2O$.0.5 $H_2O$[0.2 $Fe_2O_3$.0.8 $Al_2O_3$.0.2 CaO]25 $SiO_2$ |
| 40 | Pd | 16 | Y-type zeolite ($SiO_2$/$Al_2O_3$ molar ratio being 5.2) |
| 41 | Pd | 18 | A-type zeolite ($SiO_2$/$Al_2O_3$ molar ratio being 0.5) |
| 42 | Pd | 17 | Mordenite ($SiO_2$/$Al_2O_3$ molar ratio being 10) |
| Comparative Example 6 | Pt | 20 | Anatase-type $TiO_2$ |
| Comparative Example 7 | Pd | 20 | Anatase-type $TiO_2$ |
| Comparative Example 8 | Pt | 19 | $\gamma$-$Al_2O_3$ |
| Comparative Example 9 | Pd | 19 | $\gamma$-$Al_2O_3$ |

*Palladium salt used was palladium nitrate

Comparative Example 7

An H-type anatase-type $TiO_2$ powder was impregnated with an aqueous solution of palladium chloride to permit 1 part by weight of Pd metal to be supported by the $TiO_2$ powder, followed by evaporating the solvent and, then, sintering the Pd-impregnated $TiO_2$ powder at 500° C. for 5 hours so as to obtain a powdery catalyst. A honeycomb catalyst was prepared from the powdery catalyst as in Example 20.

Comparative Example 8

A $\gamma$-$Al_2O_3$ powder was impregnated with an aqueous solution of chloroplatinic acid ($H_2PtCl_6$) to permit 1 part by weight of platinum to be supported by the $\gamma$-$Al2O_3$ powder, followed by evaporating the solvent and, then, sintering the Pt-impregnated $\gamma$-$Al_2O_3$ powder at 500° C. for 5 hours so as A test for evaluating the selective combustion activities of carbon monoxide and methanol was conducted by loading the honeycomb catalyst prepared in each of Examples 20 to 42 and Comparative Examples 6 to 9 in a cylindrical reactor and by circulating a gaseous mixture containing carbon monoxide and methanol through the reactor. Table 8 shows the results. On the other hand, Table 7 shows the loading amount of the catalyst, the inlet temperature of the catalyst bed, GHSV, the composition of the gaseous mixture, and the circulating rate of the gaseous mixture. The CO concentration of the treated gas at the outlet port of the reactor was continuously monitored by a CO meter of ND-IR type. Also, the methanol concentration of the treated gas at the outlet port of the reactor was measured by a gas chromatograph of an FID detection type.

TABLE 7

Test conditions for evaluation of selective combustion activities of carbon monoxide and methanol (condition 1)

| | |
|---|---|
| Catalyst loading amount in reactor | 30 cc |
| Inlet temperature of catalyst bed | 70° C., 100° C. or 150° C. |
| GHSV | 15,000 h$^{-1}$ |
| Composition of gaseous mixture | CO 0.6%, methanol 0.5%, $CO_2$ 24%, $H_2O$ 20%, $O_2$ 0.6%, $H_2$ balance |
| Molar amount of $O_2$ in gaseous mixture | 1.5 mol (Total molar amount of CO and methanol is set at 1) |
| Circulating rate of gaseous mixture | 450 NL/h |

TABLE 8

Test conditions for evaluation of selective combustion activities of carbon monoxide and methanol (condition 1)
Outlet CO concentration and outlet methanol concentration at various inlet temperature of catalyst bed

| | 70° C. | | 100° C. | | 150° C. | |
|---|---|---|---|---|---|---|
| Examples | CO concentration (ppm) | methanol concentration (ppm) | CO concentration (ppm) | methanol concentration (ppm) | CO concentration (ppm) | methanol concentration (ppm) |
| 20 | 38 | 55 | 7 | 16 | 13 | 18 |
| 21 | 25 | 43 | 7 | 14 | 15 | 19 |
| 22 | 33 | 50 | 6 | 11 | 12 | 15 |
| 23 | 19 | 56 | 6 | 11 | 12 | 14 |
| 24 | 23 | 48 | 9 | 13 | 15 | 21 |
| 25 | 22 | 46 | 7 | 16 | 13 | 18 |
| 26 | 35 | 61 | 9 | 22 | 11 | 25 |
| 27 | 23 | 39 | 9 | 18 | 13 | 22 |
| 28 | 21 | 35 | 10 | 17 | 14 | 27 |
| 29 | 18 | 36 | 10 | 19 | 17 | 26 |
| 30 | 29 | 41 | 11 | 25 | 18 | 29 |
| 31 | 25 | 40 | 10 | 23 | 17 | 31 |
| 32 | 31 | 43 | 9 | 16 | 15 | 24 |
| 33 | 28 | 38 | 12 | 22 | 21 | 30 |
| 34 | 29 | 39 | 13 | 21 | 23 | 29 |
| 35 | 35 | 52 | 14 | 27 | 26 | 35 |
| 36 | 38 | 56 | 19 | 31 | 25 | 34 |
| 37 | 30 | 63 | 13 | 17 | 22 | 31 |
| 38 | 36 | 66 | 11 | 32 | 26 | 38 |
| 39 | 29 | 49 | 9 | 19 | 21 | 27 |
| 40 | 42 | 70 | 18 | 33 | 29 | 48 |
| 41 | 40 | 85 | 13 | 40 | 30 | 52 |
| 42 | 45 | 90 | 16 | 56 | 35 | 78 |
| Comparative Example 6 | 110 | 660 | 95 | 325 | 125 | 420 |
| Comparative Example 7 | 145 | 700 | 108 | 390 | 152 | 490 |
| Comparative Example 8 | 190 | 810 | 136 | 460 | 181 | 515 |
| Comparative Example 9 | 540 | 1260 | 365 | 610 | 630 | 750 | as apparent from Table 8, the catalyst in each of Examples 20 to 39, in which a crystalline silicate having the composition denoted by formula (1) under a dehydrated state is used as the carrier, and the catalyst in each of Examples 40 to 42, in which Pd is supported on a silicate carrier, were capable of lowering the CO concentration in the gaseous mixture to 50 ppm or less and the $CH_3OH$ concentration to 100 ppm or less in the case where the inlet temperature of the catalyst bed was set at 70 to 150° C.

On the other hand, in the case of using the catalysts prepared in Comparative Examples 6 to 9, in which an anatase-type $TiO_2$ or γ-$Al_2O_3$ was used as a carrier, the CO concentration and the $CH_3OH$ concentration at the outlet port of the reactor were found to be higher than those in the case of using the catalysts prepared in Examples 20 to 42.

Another test for evaluating the selective combustion activities of carbon monoxide and methanol was conducted by loading the honeycomb catalyst prepared in each of Examples 20 to 42 and Comparative Examples 6 to 9 in a cylindrical reactor and by circulating a gaseous mixture containing carbon monoxide and methanol through the reactor. Table 10 shows the results. On the other hand, Table 9 shows the loading amount of the catalyst, the inlet temperature of the catalyst bed, GHSV, the composition of the gaseous mixture, and the circulating rate of the gaseous mixture. The CO concentration of the treated gas at the outlet port of the reactor was continuously monitored by a CO meter of ND-IR type. Also, the methanol concentration of the treated gas at the outlet port of the reactor was measured by a gas chromatograph of an FID detection type.

TABLE 9

Test conditions for evaluation of selective combustion activities of carbon monoxide and methanol (condition 2)

| | |
|---|---|
| Catalyst loading amount in reactor | 30 cc |
| Inlet temperature of catalyst bed | 70° C., 100° C. or 150° C. |

TABLE 9-continued

Test conditions for evaluation of selective combustion activities of
carbon monoxide and methanol (condition 2)

| | |
|---|---|
| GHSV | 10,000 h$^{-1}$ |
| Composition of gaseous mixture | CO 1%, methanol 1%, CO$_2$ 24%, H$_2$O 20%, O$_2$ 0.6%, H$_2$ balance |
| Molar amount of O$_2$ in gaseous mixture | 1.5 mol (Total molar amount of CO and methanol is set at 1) |
| Circulating rate of gaseous mixture | 300 NL/h |

TABLE 10

Test conditions for evaluation of selective combustion activities of
carbon monoxide and methanol (condition 2)
Outlet CO concentration and outlet methanol concentration at various inlet
temperature of catalyst bed

| | 50° C. | | 100° C. | | 150° C. | |
|---|---|---|---|---|---|---|
| Examples | CO concentration (ppm) | methanol concentration (ppm) | CO concentration (ppm) | methanol concentration (ppm) | CO concentration (ppm) | methanol concentration (ppm) |
| 20 | 50 | 63 | 18 | 34 | 44 | 55 |
| 21 | 44 | 54 | 16 | 25 | 41 | 46 |
| 22 | 39 | 48 | 14 | 21 | 36 | 39 |
| 23 | 39 | 48 | 14 | 20 | 35 | 38 |
| 24 | 45 | 58 | 20 | 29 | 43 | 44 |
| 25 | 52 | 61 | 26 | 32 | 47 | 46 |
| 26 | 41 | 59 | 23 | 30 | 55 | 45 |
| 27 | 43 | 55 | 25 | 28 | 41 | 39 |
| 28 | 47 | 57 | 22 | 28 | 40 | 37 |
| 29 | 40 | 49 | 21 | 24 | 40 | 35 |
| 30 | 38 | 44 | 13 | 21 | 35 | 36 |
| 31 | 39 | 48 | 14 | 23 | 37 | 39 |
| 32 | 50 | 65 | 26 | 32 | 41 | 58 |
| 33 | 48 | 58 | 23 | 31 | 34 | 49 |
| 34 | 39 | 46 | 17 | 27 | 33 | 41 |
| 35 | 41 | 48 | 18 | 26 | 30 | 43 |
| 36 | 47 | 53 | 21 | 30 | 41 | 50 |
| 37 | 42 | 50 | 15 | 25 | 31 | 43 |
| 38 | 50 | 60 | 28 | 35 | 40 | 53 |
| 39 | 50 | 68 | 33 | 38 | 45 | 60 |
| 40 | 96 | 99 | 41 | 55 | 88 | 71 |
| 41 | 88 | 98 | 35 | 44 | 69 | 60 |
| 42 | 78 | 81 | 41 | 50 | 68 | 77 |
| Comparative Example 6 | 185 | 405 | 150 | 310 | 180 | 360 |
| Comparative Example 7 | 200 | 240 | 180 | 220 | 250 | 260 |
| Comparative Example 8 | 330 | 450 | 270 | 350 | 360 | 400 |
| Comparative Example 9 | 690 | 790 | 520 | 690 | 600 | 750 |

As apparent from Table 10, the catalyst in each of Examples 20 to 39, in which a crystalline silicate having the composition denoted by formula (1) under a dehydrated state was used as the carrier, and the catalyst in each of Examples 40 to 42, in which Pd was supported on a silicate carrier, were capable of more lowering the Co concentration and the CH$_3$OH concentration in the gaseous mixture than the catalyst in each of Comparative Examples 6 to 9 in the case where the inlet temperature of the catalyst bed was set at 70 to 150° C.

In the Examples described above, the catalyst was of honeycomb structure. However, the type of the catalyst is not particularly limited in the present invention. For example, the catalyst may be of tablet type or of Raschig ring type.

As described above in detail, the present invention provides a selective carbon monoxide oxidizing catalyst capable of selectively oxidizing CO of a gaseous mixture containing H$_2$, CO and an oxidizing agent of O$_2$ and a method of selectively removing carbon monoxide capable of selectively removing CO from a gaseous mixture containing H$_2$, CO and an oxidizing agent of O$_2$.

The present invention also provides a hydrogen refining catalyst capable of selectively oxidizing CO and CH$_3$OH of a gaseous mixture containing H$_2$, CO, CH$_3$OH and an oxidizing agent of O$_2$ and exhibiting an improved selective oxidizing capability and a method of selectively oxidizing and removing CO and CH$_3$OH from a gaseous mixture containing H$_2$, CO, CH$_3$OH and an oxidizing agent of O$_2$ and exhibiting an improved removal rate.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for selectively removing carbon monoxide, comprising: bringing a gaseous mixture containing $H_2$, CO and an oxidizing agent of $O_2$ into contact with a selective oxidizing catalyst of carbon monoxide for selectively oxidizing and removing CO from said gaseous mixture, said selective oxidizing catalyst of carbon monoxide comprising a carrier and an active metal comprising at least one kind of metal selected from the group consisting of Pt, Pd, Ru, Rh and Ir and supported on said carrier, said carrier comprising a crystalline silicate having the highest to the fifth highest peaks in the powder X-ray diffraction using CuKα X-ray in the lattice spacing of 3.65±0.1 Å, 3.75±0.1 Å, 3.85±0.1 Å, 10.0±0.3 Å, and 11.2±0.3 Å and said crystalline silicate having the composition represented by formula (1) under a dehydrated state:

$$(1\pm 0.8)R_2O \cdot [aM_2O_3 \cdot bNO \cdot cAl_2O_3] \cdot ySiO_2 \tag{1}$$

where R denotes at least one element selected from the group consisting of an alkali metal and H, M denotes at least one element selected from the group consisting of VIII group elements, rare earth elements, Ti, V, Cr, Nb, Sb and Ga, N denotes at least one element selected from the group consisting of Mg, Ca, Sr, and Ba, and the molar ratios a, b, c and y are: $0 \leq a$, $0 \leq b \leq 20$, $a+c=1$, and $11 \leq y \leq 3000$.

2. The selective removing method of carbon monoxide according to claim 1, wherein the molar ratio of the oxygen concentration to the carbon monoxide concentration ($O_2$ concentration/carbon monoxide concentration) in said gaseous mixture falls within a range of between 0.5 and 5.

3. The selective removing method of carbon monoxide according to claim 1, wherein the carbon monoxide concentration in said gaseous mixture is not higher than 4%.

4. A method for selectively removing carbon monoxide, comprising:

preparing a reactor loaded with a catalyst bed housing a selective carbon monoxide oxidizing catalyst; and passing a gaseous mixture containing $H_2$, CO and an oxidizing agent of $O_2$ through said reactor so as to selectively oxidize CO and, thus, remove CO from said gaseous mixture, wherein:

the inlet temperature of said catalyst bed is set at 50 to 250° C.; and said selective carbon monoxide oxidizing catalyst comprises a carrier and an active metal comprising at least one kind of metal selected from the group consisting of Pt, Pd, Ru, Rh and Ir and supported on said carrier, said carrier comprising a crystalline silicate having the highest to the fifth highest peaks in the powder X-ray diffraction using CuKα X-ray in the lattice spacing of 3.65±0.1 Å, 3.75±0.1 Å, 3.85±0.1 Å, 10.0±0.3 Å and 11.2±0.3 Å, and said crystalline silicate having the composition represented by formula (1) under a dehydrated state:

$$(1\pm 0.8)R_2O \cdot [aM_2O_3 \cdot bNO \cdot cAl_2O_3] \cdot ySiO_2 \tag{1}$$

where R denotes at least one element selected from the group consisting of an alkali metal and H, M denotes at least one element selected from the group consisting of VIII group elements, rare earth elements, Ti, V, Cr, Nb, Sb and Ga, N denotes at least one element selected from the group consisting of Mg, Ca, Sr, and Ba, and the molar ratios a, b, c and y are: $0 \leq a$, $0 \leq b \leq 20$, $a+c=1$, and $11 \leq y \leq 3000$.

5. A hydrogen refining method, comprising bringing a gaseous mixture containing $H_2$, CO, $CH_3OH$ and an oxidizing agent of $O_2$ into contact with a hydrogen refining catalyst so as to selectively oxidize and remove CO and $CH_3OH$ from said gaseous mixture, said hydrogen refining catalyst comprising a carrier and an active species supported on said carrier, said carrier comprising a crystalline silicate having the highest to the fifth highest peaks in the powder X-ray diffraction using CuKα X-ray in the lattice spacing of 3.65±0.1 Å, 3.75±0.1 Å, 3.85±0.1 Å, 10.0±0.3 Å and 11.2±0.3 Å, and said crystalline silicate having the composition represented by formula (1) under a dehydrated state:

$$(1\pm 0.8)R_2O \cdot [aM_2O_3 \cdot bNO \cdot cAl_2O_3] \cdot ySiO_2 \tag{1}$$

where R denotes at least one element selected from the group consisting of an alkali metal and H, M denotes at least one element selected from the group consisting of VIII group elements, rare earth elements, Ti, V, Cr, Nb, Sb and Ga, N denotes at least one element selected from the group consisting of Mg, Ca, Sr, and Ba, and the molar ratios a, b, c and y are: $0 \leq a$, $0 \leq b \leq 20$, $a\pm c=1$, and $11 \leq y \leq 3000$.

6. The hydrogen refining method according to claim 5, wherein the molar amount of $O_2$ is 0.5 to 20 times as large as the total molar amount of CO and $CH_3OH$.

7. The hydrogen refining method according to claim 5, wherein the carbon monoxide concentration in said gaseous mixture is not higher than 4%, and the methanol concentration in said gaseous mixture is not higher than 2%.

8. The hydrogen refining method according to claim 5, wherein the methanol concentration in said gaseous mixture is not higher than 2%.

9. The hydrogen refining method according to claim 5, wherein said active species contains at least one metal selected from the group consisting of Pt, Pd, Ru, Rh and Ir.

10. The hydrogen refining method according to claim 5, wherein the molar amount of $O_2$ is 1.5 to 3 times as large as the total molar amount of CO and $CH_3OH$.

11. A hydrogen refining method, comprising:

preparing a reactor loaded with a catalyst bed housing a hydrogen refining catalyst; and passing a gaseous mixture containing $H_2$, Co, $CH_3OH$ and an oxidizing agent of $O_2$ through said reactor so as to selectively oxidize CO and $CH_3OH$, thus, remove CO and $CH_3OH$ from said gaseous mixture, wherein:

the inlet temperature of said catalyst bed is set at 50 to 250° C.; and said hydrogen refining catalyst comprises a carrier and an active species supported on said carrier, said carrier comprising a crystalline silicate having the highest to the fifth highest peaks in the powder X-ray diffraction using CuKα X-ray in the lattice spacing of 3.65±0.1 Å, 3.75±0.1 Å, 3.85±0.1 Å, 10.0±0.3 Å and 11.2±0.3 Å, and said crystalline silicate having the composition represented by formula (1) under a dehydrated state:

$$(1\pm 0.8)R_2O \cdot [aM_2O_3 \cdot bNO \cdot cAl_2O_3] \cdot ySiO_2 \tag{1}$$

where R denotes at least one element selected from the group consisting of an alkali metal and H, M denotes at least one element selected from the group consisting of VIII group elements, rare earth elements, Ti, V, Cr, Nb, Sb and Ga, N denotes at least one element selected from the group consisting of Mg, Ca, Sr, and Ba, and the molar ratios a, b, c and y are: 0≦a, 0 ≦b≦20, a+c=1, and 11≦y≦3000.

12. A hydrogen refining method, comprising bringing a gaseous mixture containing $H_2$, CO, $CH_3OH$ and an oxidizing agent Of $O_2$ into contact with a hydrogen refining catalyst so as to selectively oxidize CO and $CH_3OH$, thus, remove CO and $CH_3OH$ from said gaseous mixture, wherein a molar amount of $O_2$ in said gaseous mixture is 0.5 to 20 times as large as that of the total molar amount of CO and $CH_3OH$, and said hydrogen refining catalyst comprises a carrier comprising a silicate and an active species comprising Pd and supported on said carrier.

13. The hydrogen refining method according to claim 12, wherein the molar amount of $O_2$ is 1.5 to 3 times as large as the total molar amount of CO and $CH_3OH$.

14. The hydrogen refining method according to claim 12, wherein the carbon monoxide concentration in said gaseous mixture is not higher than 4%, and the methanol concentration in said gaseous mixture is not higher than 2%.

15. The hydrogen refining method according to claim 12, wherein the methanol concentration in said gaseous mixture is not higher than 2%.

16. The hydrogen refining method according to claim 12, wherein said silicate comprising at least one compound selected from the group consisting of Y-type zeolite, A-type zeolite, mordenite and a crystalline silicate, said crystalline silicate having the highest to the fifth highest peaks in the powder X-ray diffraction using CuKα ray in the lattice spacing of 3.65±0.1 Å, 3.75±0.1 Å, 3.85±0.1 Å, 10.0±0.3 Å and 11.2±0.3 Å, and said crystalline silicate having the composition represented by formula (1) under a dehydrated state:

$$(1\pm 0.8)R_2O \cdot [aM_2O_3 \cdot bNO \cdot cAl_2O_3] \cdot ySiO_2 \tag{1}$$

where R denotes at least one element selected from the group consisting of an alkali metal and H, M denotes at least one element selected from the group consisting of VIII group elements, rare earth elements, Ti, V, Cr, Nb, Sb and Ga, N denotes at least one element selected from the group consisting of Mg, Ca, Sr, and Ba, and the molar ratios a, b, c and y are: 0≦a, 0≦b≦20, a+c=1, and 11≦y≦3000.

17. A hydrogen refining method, comprising:

preparing a reactor loaded with a catalyst bed housing a hydrogen refining catalyst; and passing a gaseous mixture containing $H_2$, CO, $CH_3OH$ and an oxidizing agent of $O_2$ through said reactor so as to selectively oxidize CO and $CH_3OH$, thus, remove CO and $CH_3OH$ from said gaseous mixture, a molar amount of $O_2$ in said gaseous mixture is 0.5 to 20 times as large as that of the total molar amount of CO and $CH_3OH$ wherein the inlet temperature of said catalyst bed is set at 50 to 250° C.; and said hydrogen refining catalyst comprises a carrier comprising a silicate and an active species comprising Pd and supported on said carrier.

* * * * *